United States Patent
Bäcker et al.

(10) Patent No.: US 7,448,281 B2
(45) Date of Patent: Nov. 11, 2008

(54) MAGNETIC INDUCTION FLOWMETER HAVING A METAL MEASURING TUBE

(75) Inventors: Ralf Bäcker, Bovenden (DE); Franz Krope, Kerpen-Sindorf (DE)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 11/709,251

(22) Filed: Feb. 22, 2007

(65) Prior Publication Data
US 2007/0193366 A1    Aug. 23, 2007

(30) Foreign Application Priority Data
Feb. 23, 2006    (DE) ............... 10 2006 008 451

(51) Int. Cl.
*G01F 1/58* (2006.01)

(52) U.S. Cl. ................................... 73/861.12

(58) Field of Classification Search ............. 73/861.12, 73/861.11, 861.14, 861.16, 861.17
See application file for complete search history.

(56) References Cited

U.S. PATENT DOCUMENTS

| | | | | |
|---|---|---|---|---|
| 3,824,856 A | * | 7/1974 | Yard | ......... 73/861.12 |
| 4,329,879 A | | 5/1982 | Appel et al. | |
| 5,207,105 A | * | 5/1993 | Fukunaga et al. | ......... 73/861.12 |
| 5,664,315 A | | 9/1997 | Unterseh | |
| 5,693,892 A | * | 12/1997 | Batey | ...................... 73/861.12 |
| 2004/0149046 A1 | | 8/2004 | Yamazaki | |

FOREIGN PATENT DOCUMENTS

| | | |
|---|---|---|
| EP | 0 766 069 A1 | 4/1997 |
| JP | 62035224 A | 2/1987 |
| WO | WO 93/09403 | 5/1993 |

* cited by examiner

*Primary Examiner*—Jewel V Thompson
(74) *Attorney, Agent, or Firm*—Buchanan Ingersoll & Rooney PC

(57) ABSTRACT

A magnetic induction flowmeter having a metal measuring tube (1), which can be inserted into a pipeline system via flanged sections (2a, 2b) at the ends, having at least two mutually opposite measuring electrodes (5a, 5b) introduced into the wall of the measuring tube (1) in an electrically insulated manner in order to register a measuring voltage, a magnetic unit (4), likewise arranged on the outside of the measuring tube (1), generating a magnetic field aligned substantially at right angles to the flow direction of the conductive flow medium to be measured, and the measuring tube (1) being provided with an electrically insulating layer (6) on the inside; in the region of the flanged sections (2a, 2b) at the end of the measuring tube (1), an expanded lattice (7) being fixed to the measuring tube (1), to which lattice the insulating layer (6) is applied in such a way that the expanded lattice (7) located within the insulating layer (6) ensures a firm connection between insulating layer (6) and measuring tube (1).

18 Claims, 1 Drawing Sheet

MAGNETIC INDUCTION FLOWMETER HAVING A METAL MEASURING TUBE

CROSS REFERENCE TO RELATED APPLICATIONS

This application claims priority under 35 U.S.C. §119 to German Application 10 2006 008 451.9 filed in Germany on 23 Feb. 2006, the entire contents of which are hereby incorporated by reference in their entireties.

FIELD

The invention relates to a magnetic induction flowmeter having a metal measuring tube, which can be inserted into a pipeline system via flanged sections at the ends, having at least two mutually opposite measuring electrodes introduced into the wall of the measuring tube in an electrically insulated manner in order to register a measuring voltage, a magnetic unit, likewise arranged on the outside of the measuring tube, generating a magnetic field aligned substantially at right angles to the flow direction of the conductive flow medium to be measured, and the measuring tube being provided with an electrically insulating layer on the inside.

BACKGROUND INFORMATION

A magnetic induction flowmeter is preferably used as a flowmeter for liquids, pulps and pastes which have a specific minimum electric conductivity. This type of flowmeter is distinguished by quite accurate measured results, no pressure loss in the pipeline system being caused by the measurement. In addition, magnetic induction flowmeters have no parts which move or project into the measuring tube and which are especially subject to wear. The area of use of the flowmeters of interest here extends primarily to applications in the chemical industry, pharmaceuticals and the cosmetic industry, and also the communal water and effluent business as well as the foodstuffs industry.

Faraday's induction law forms the physical basis of the measuring method of a magnetic induction flowmeter. This natural law states that a voltage is induced in a conductor moving in a magnetic field. During the utilization of this natural law for measurement, the electrically conductive medium flows through a measuring tube in which a magnetic field is generated at right angles to the flow direction. The voltage induced in the medium is picked up by an electrode arrangement. Since the measured voltage obtained in this way is proportional to the average flow velocity of the flowing medium, the volume flow of the medium can be determined from it. In addition, by taking account of the density of the flowing medium, its mass flow can also be determined.

WO 93/09403 discloses a generic magnetic induction flowmeter. Its electrode arrangement, comprising two measuring electrodes let into the measuring tube opposite each other, interacts with a magnetic coil arrangement, which generates the required magnetic field at right angles to the flow direction in the measuring tube. Within this magnetic field, each volume element of the flowing medium moving through the magnetic field, with the field strength present in this volume element, supplies a contribution to the measuring voltage, picked up by the measuring electrodes. The measuring voltage is supplied to the input of evaluation electronics which are connected downstream and which carry out the subsequent measured value processing.

The measuring tube of the magnetic induction flowmeter, which is composed of metal, is electrically conductive and therefore lined with an insulating layer composed of a non-conductive material, in order that the measuring principle functions. This ensures that the flow medium does not come into contact with the electrically conductive measuring tube, which is normally at ground potential, but comes into contact with the insulating layer from which the measuring electrodes that make contact with the substance to be measured protrude. Here, the insulating layer is constructed in the manner of what is known as a liner, that is to say a body which is tubular in the basic state, which is drawn into the measuring tube and is then bent over outward in the flanged region in order to form a rim. The liner is fixed to the metallic measuring tube via the outwardly bent rim. For this purpose, the rim is clamped in via an external annular end plate by means of a screw fixing. Thus, the annular end plate forms the sealing region for the corresponding flange of the pipeline adjacent thereto. The liner is also fixed to the measuring tube via the measuring electrodes in the central region of the latter.

One disadvantage of this solution for fixing the electric insulating layer to the measuring tube is that this is quite complicated to implement in terms of fabrication. It requires additional components, in particular the annular end plate, in order to implement this clamping solution. Moreover, a plurality of screw fixings are needed in the peripheral region of the end flange in order to ensure secure retention of the liner on the measuring tube, which results in corresponding expenditure on mounting.

In addition, the general prior art discloses a fixing solution for the insulating layer of a magnetic induction flowmeter to the measuring tube which, as opposed to the prior art described above, is formed in the manner of a non-detachable connection between insulating layer and measuring tube. In order to ensure secure retention of the insulating layer on the measuring tube, in this case grooves are introduced in the region of the sealing surface of the measuring tube flange for the purpose of connecting the insulating layer to the measuring tube in a form-fitting manner. The grooves are primarily designed in the form of dovetail grooves in order to ensure a form fit. The insulating layer is normally applied to the inner surface and the flanged region of the measuring tube by injection molding. The material used is a thermoplastic which, during the injection molding, gets into the grooves on the side of the measuring tube, so that the result is a secure, non-detachable connection between insulating layer and measuring tube. Since this technical solution assumes the introduction of grooves into the measuring tube, fabrication problems occur in particular when the measuring tube is to consist of a stainless steel, that is to say a non-rusting steel, as is required in the foodstuffs industry, for example. This is because it is quite complicated to machine stainless steel by removing material.

SUMMARY

The object of the present invention is therefore to provide a magnetic induction flowmeter whose insulating layer can be applied in a manner which is simple in fabrication terms and ensures permanent retention to the metallic measuring tube.

On the basis of a magnetic induction flowmeter according to the preamble of claim 1, the object is achieved in conjunction with the defining features of the latter. The following dependent claims reproduce the advantageous developments of the invention.

The invention includes the technical teaching that, in the region of the flanged sections at the end of the measuring tube, an expanded lattice is fixed to the measuring tube, to which lattice the insulating layer is applied in such a way that the expanded lattice located within the insulating layer ensures a firm connection between insulating layer and measuring tube.

The advantage of the solution according to the invention is in particular that machining of the measuring tube by removing material can be dispensed with completely. This is because an expanded lattice may be fixed quite simply in fabrication terms to a supporting element—here the measuring tube. The expanded lattice supports the insulating layer and promotes the connection to the measuring tube, so that separation of the insulating layer from the surface of the measuring tube does not have to be feared. As opposed to fixing the insulating layer to the measuring tube via grooves machined into the latter, a further advantage of the solution according to the invention is that the insulating layer is not retained on the measuring tube just in specific point-like regions but over the entire area over which the expanded lattice extends.

The expanded lattice preferably extends at least over the sealing region of the flanged sections of the measuring tube. At this point, the expanded lattice produces secure contact with the outwardly projecting rim of the inner layer. In addition, the connection between insulating layer and measuring tube is reinforced by mounting the flowmeter in the pipeline, since in this case the insulating layer is located between two flanges to be screwed together.

In this connection, according to a further measure improving the invention, provision is made for the region of the insulating layer covering the sealing region of the flanged sections, also simultaneously functioning as a seal, to come directly into contact with the corresponding pipeline flange. A separate seal at this point can therefore be dispensed with. Of course, this measure can only be implemented when the material of the insulating layer also has adequate sealing properties and forms a flat sealing surface with which the pipeline flange can come into contact.

The metallic measuring tube is preferably composed of a non-rusting steel, selected from the group of stainless steels. In particular in uses of the subject of the invention which are hygienically sensitive, the material stainless steel is suitable for the production of the measuring tube. This is because stainless steel is pressure-resistant, exhibits little corrosion and can be cleaned easily.

The expanded lattice to be applied to the metallic measuring tube is preferably composed of a material that can be welded, since the fitting of the expanded lattice to the measuring tube is preferably carried out by means of spot welding. The spot welding method may be carried out simply in terms of fabrication and ensures the desired secure cohesion with the measuring tube. If the metallic measuring tube is composed of steel, the expanded lattice should be composed of a steel that can be welded in order to carry out the welding method. Of course, it is also conceivable for other materials that can be welded to be used for the measuring tube and expanded lattice.

According to a possible embodiment of the invention, the electric insulating layer can be formed in the manner of a liner drawn into the measuring tube. As an alternative to this, it is also possible to implement the electric insulating layer as an internal coating, preferably by spraying on or injection molding on electrically nonconductive thermoplastic.

Also suitable as a material for the electric insulating layer of the measuring tube is, in particular, a fluorocarbon material or a PTFE material which, according to one of the suitable measures outlined above, forms the electric insulating layer of the measuring tube.

BRIEF DESCRIPTION OF THE DRAWINGS

Further measures improving the invention will be illustrated in more detail below together with the description of one preferred exemplary embodiment of the invention and by using the figures, in which.

DETAILED DESCRIPTION

Figure 1:
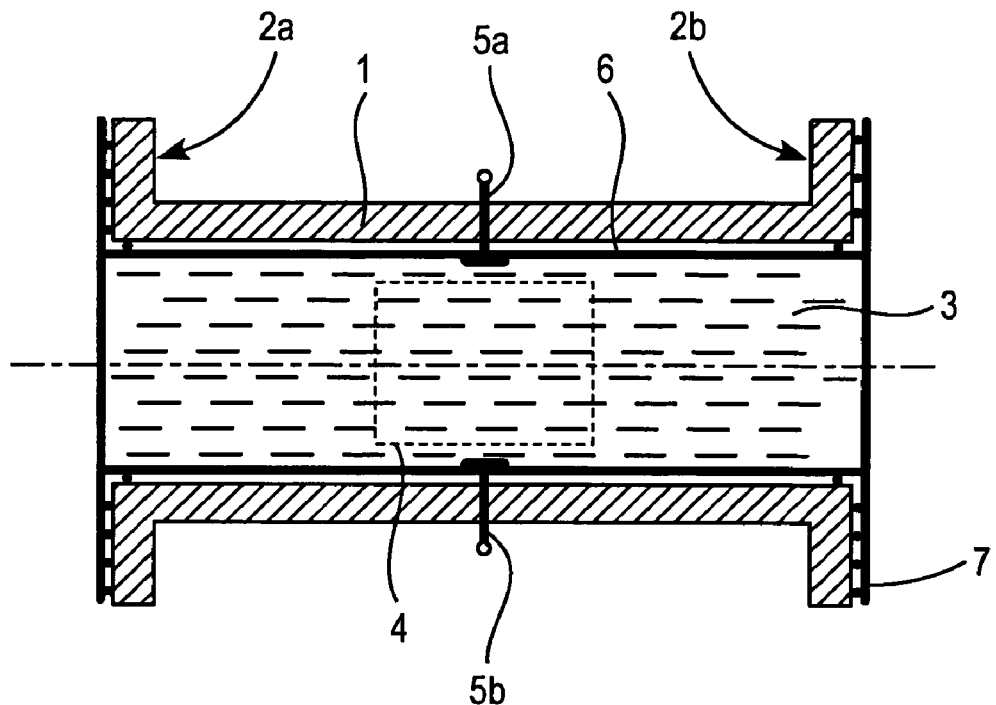
FIG. 1 shows a longitudinal section of a magnetic induction flowmeter.

According to FIG. 1, the magnetic induction flowmeter substantially comprises a stainless steel measuring tube 1, which can be inserted into a pipeline—not illustrated further here—via flanged sections 2a and 2b at the ends and is detachably connected to said pipeline via corresponding flanged sections by means of screw fixing.

A free-flowing flow medium 3 flows through the measuring tube 1. The flow medium 3 has an at least slight electrical conductivity in order to implement the magnetic induction flow measuring principle. Also provided on the outside of the measuring tube 1 is a magnetic unit 4, which comprises mutually opposite magnets—which can be seen only partly here—and is used to generate a magnetic field running at right angles to the axis of the measuring tube 1. The magnetic unit 4 corresponds to two mutually opposite measuring electrodes 5a, 5b inserted in an insulating manner into the measuring tube 1. The measuring electrodes 5a, 5b are aligned at right angles to the magnetic field axis and are used to measure a measured voltage induced as a consequence of the flow of the flow medium 3. The measured signal is supplied to an electronics unit—not illustrated further—connected downstream, which performs the further measured signal processing.

In order to insulate the electrically conductive measuring tube 1 electrically with respect to the flow medium 3, the measuring tube 1 is provided with an electric insulating layer 6. In this exemplary embodiment, the electric insulating layer 6 is implemented as an internal plastic coating, which is applied to the measuring tube 1 by being sprayed on. In order to ensure a firm connection of the insulating layer 6 applied in this way to the measuring tube 1, an expanded lattice 7 is provided in the region of the flanged sections 2a and 2b at the ends of the measuring tube 1, which lattice is fixed to the measuring tube 1 and to which the insulating layer 6 is applied.

Figure 2:
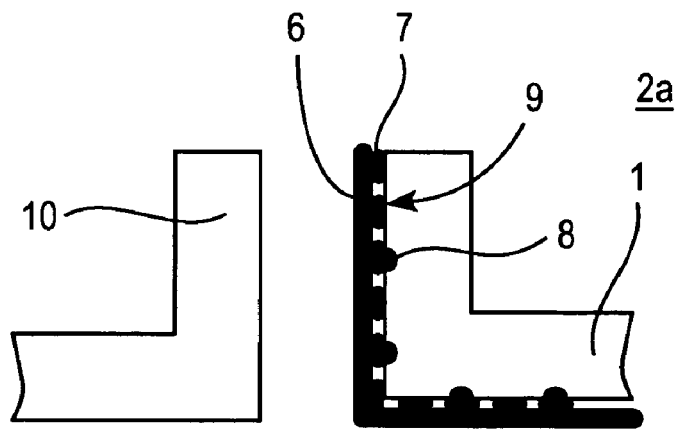
FIG. 2 shows a detailed enlargement of the longitudinal cross section from FIG. 1 in the region of one of the flanged sections.

As emerges more clearly from FIG. 2, the expanded lattice 7 does not merely extend over the sealing region 9 of the flanged section 2a illustrated here by way of example but also projects somewhat into the inner region of the measuring tube 1, in order to promote a particularly secure connection. The expanded lattice 7 is fixed to the stainless steel measuring tube 1 via welds 8, which are produced by spot welding.

The region of the insulating layer 6 that covers the sealing region 9 of the flanged section 2a also performs the function of a seal and comes directly into contact with the corresponding pipeline flange 10.

The invention is not restricted to the exemplary embodiment described in detail above. For example, it is also conceivable for the electrically insulating inner layer 6—depending on the physical and chemical boundary conditions—to be composed of another suitable material which may be connected firmly to the measuring tube 1 in the manner according to the invention.

LIST OF DESIGNATIONS

1 Measuring tube
2 Flanged section
3 Flow medium
4 Magnetic unit
5 Measuring electrode
6 Insulating layer
7 Expanded lattice
8 Weld
9 Sealing region
10 Pipeline flange

The invention claimed is:

1. A magnetic induction flowmeter having a metal measuring tube (1), which can be inserted into a pipeline system via flanged sections (2a, 2b) at the ends, having at least two mutually opposite measuring electrodes (5a, 5b) introduced into the wall of the measuring tube (1) in an electrically insulated manner in order to register a measuring voltage, a magnetic unit (4), likewise arranged on the outside of the measuring tube (1), generating a magnetic field aligned substantially at right angles to the flow direction of the conductive flow medium to be measured, and the measuring tube (1) being provided with an electrically insulating layer (6) on the inside, wherein, in the region of the flanged sections (2a, 2b) at the end of the measuring tube (1), an expanded lattice (7) is fixed to the measuring tube (1), to which lattice the insulating layer (6) is applied in such a way that the expanded lattice (7) located within the insulating layer (6) ensures a firm connection between insulating layer (6) and measuring tube (1).

2. The magnetic induction flowmeter as claimed in claim 1, wherein the expanded lattice (7) extends at least over the sealing region (9) of the flanged sections (2a, 2b).

3. The magnetic induction flowmeter as claimed in claim 1, wherein the metallic measuring tube (1) is composed of a non-rusting steel, selected from the group of stainless steels.

4. The magnetic induction flowmeter as claimed in claim 1, wherein the expanded lattice (7) is fixed to the measuring tube (1) by means of spot welding.

5. The magnetic induction flowmeter as claimed in claim 1, wherein the expanded lattice (7) is composed of a steel that can be welded.

6. The magnetic induction flowmeter as claimed in claim 1, wherein the electrically insulating layer (6) is at least partly formed in the manner of a liner drawn into the measuring tube (1).

7. The magnetic induction flowmeter as claimed in claim 1, wherein the electrically insulating layer (6) is at least partly implemented as an internal coating, which is applied by spraying on or injection molding on.

8. The magnetic induction flowmeter as claimed in claim 1, wherein the electrically insulating layer (6) is composed of electrically nonconductive thermoplastic.

9. The magnetic induction flowmeter as claimed in claim 1, wherein the electrically insulating layer (6) is at least partly composed of a fluorocarbon material or PTFE material.

10. The magnetic induction flowmeter as claimed in claim 1, wherein the region of the insulating layer (6) covering the sealing region (9) of the flanged sections (2a, 2b), functioning as a seal, comes directly into contact with the corresponding pipeline flange (10).

11. The magnetic induction flowmeter as claimed in claim 2, wherein the region of the insulating layer covering the sealing region of the flanged sections, functioning as a seal, comes directly into contact with the corresponding pipeline flange.

12. The magnetic induction flowmeter as claimed in claim 3, wherein the region of the insulating layer covering the sealing region of the flanged sections, functioning as a seal, comes directly into contact with the corresponding pipeline flange.

13. The magnetic induction flowmeter as claimed in claim 4, wherein the region of the insulating layer covering the sealing region of the flanged sections, functioning as a seal, comes directly into contact with the corresponding pipeline flange.

14. The magnetic induction flowmeter as claimed in claim 5, wherein the region of the insulating layer covering the sealing region of the flanged sections, functioning as a seal, comes directly into contact with the corresponding pipeline flange.

15. The magnetic induction flowmeter as claimed in claim 6, wherein the region of the insulating layer covering the sealing region of the flanged sections, functioning as a seal, comes directly into contact with the corresponding pipeline flange.

16. The magnetic induction flowmeter as claimed in claim 7, wherein the region of the insulating layer covering the sealing region of the flanged sections, functioning as a seal, comes directly into contact with the corresponding pipeline flange.

17. The magnetic induction flowmeter as claimed in claim 8, wherein the region of the insulating layer covering the sealing region of the flanged sections, functioning as a seal, comes directly into contact with the corresponding pipeline flange.

18. The magnetic induction flowmeter as claimed in claim 9, wherein the region of the insulating layer covering the sealing region of the flanged sections, functioning as a seal, comes directly into contact with the corresponding pipeline flange.

* * * * *